(12) United States Patent
Fini (10) Patent No.: US 9,158,065 B2
(45) Date of Patent: Oct. 13, 2015

(54) HOLLOW CORE FIBER WITH POLARIZATION DEPENDENT LOSS

(71) Applicant: OFS Fitel, LLC, Norcross, GA (US)

(72) Inventor: John M Fini, Metuchen, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/202,079

(22) Filed: Mar. 10, 2014

(65) Prior Publication Data

US 2014/0270666 A1 Sep. 18, 2014

Related U.S. Application Data

(63) Continuation-in-part of application No. PCT/US2013/032652, filed on Mar. 15, 2013.

(51) Int. Cl.
*G02B 6/02* (2006.01)
*G02B 6/024* (2006.01)
*G02B 6/14* (2006.01)

(52) U.S. Cl.
CPC ........ *G02B 6/02328* (2013.01); *G02B 6/02352* (2013.01); *G02B 6/02357* (2013.01); *G02B 6/024* (2013.01); *G02B 6/02309* (2013.01); *G02B 6/14* (2013.01)

(58) Field of Classification Search
CPC ........... G02B 6/02328; G02B 6/02352; G02B 6/02357
USPC ......................................................... 385/125
See application file for complete search history.

(56) References Cited

U.S. PATENT DOCUMENTS

| 7,551,819 B2 | 6/2009 | Dangui | |
| 2007/0242923 A1* | 10/2007 | Fini | 385/125 |
| 2010/0002980 A1* | 1/2010 | Fini | 385/11 |

* cited by examiner

*Primary Examiner* — Ryan Lepisto (57) ABSTRACT

A hollow core fiber having polarization dependent loss is provided. The hollow core fiber embedded in a cellular cladding having a plurality of cells arranged in a nominally regular cellular lattice. A pre-determined number of cells at pre-determined locations within a cellular cladding are substituted by leakage cells that differ in at least one property including a physical or a chemical property, or both. The leakage cells collectively provide a leakage path that may preferably be made polarization sensitive, such that a core mode with a particular polarization state is selectively coupled to the cladding, thereby inducing polarization dependent loss. The leakage cells may be dispersed along a symmetry axis in a radial distance longer than one or more lattice spacing away from the core. The polarization dependent loss may be controlled further by asymmetric core shapes and/or by introducing additional surface features along the core-cladding interface.

16 Claims, 11 Drawing Sheets

HOLLOW CORE FIBER WITH POLARIZATION DEPENDENT LOSS

CROSS REFERENCE TO RELATED APPLICATIONS

The present application is a Continuation-In-Part of the PCT Application No. PCT/US/1332652 filed on Mar. 15, 2013, with the United States Receiving Office; the content of the above referenced application co-owned by the assignee of the present application, is being incorporated by reference herein in its entirety.

STATEMENT REGARDING FEDERALLY SPONSORED RESEARCH AND DEVELOPMENT

This invention reported in this application is supported using a government grant awarded by DARPA under the contract No. HR0011-08-C-0019 from 2008 till present. The government has certain rights in the invention.

BACKGROUND OF THE INVENTION

1. Field of the Invention

This application is related to the field of optical fiber and in particular, to Hollow Core Fiber (HCF) exhibiting selective polarization dependent properties for supporting a selected polarization state of a signal transmitted in the hollow core of the fiber.

2. Description of the Related Arts

Hollow-core fibers have unique advantages in several applications. For example, they can provide ultra-low nonlinearity since most of the signal power can be guided in air or vacuum. This is useful in an optical sensor application for example, an optical gyro, where fiber nonlinearities contribute significantly to noise and hence compromise performance. Guidance in a hollow core also mitigates other impairments related to interaction of the signal with the substrate, for example, thermal drift of propagation parameters. However, two polarization components of the signal typically present in a guided mode can obscure measurements in a sensor, and generally introduce uncertainty and interference into a system causing additional impairments.

A hollow-core fiber having a predominantly single polarization state is desirable for applications such as optical communication where polarization dependent loss may add to loss caused by other impairments for example, chromatic dispersion. One way to achieve a single polarization state is to selectively suppress one of the two polarization states. In prior art fibers, a variety of features have been proposed to control birefringence. These include modification of surface modes, selective coupling between the core and one or more modes of additional waveguide structures, for example.

In an earlier U.S. Pat. No. 7,865,051 issued on Jan. 4, 2011, to Fini, an additional waveguide in the cladding layer is placed in the vicinity of the hollow core. The additional waveguide is designed to support modes which have propagation constants similar to certain modes of the hollow core. More specifically, the additional waveguide dimension and geometry is carefully selected such that the core modes having polarization along one axis are selectively coupled to the modes of the additional waveguide. In the U.S. Pat. No. 7,551,819 issued to Dangui et al. on Jun. 23, 2009, selective suppression of polarization along one axis is utilized in constructing polarization couplers/splitters using hollow core fiber.

In yet another approach described in the co-owned and co-pending PCT application No. PCT/US/1332652, filed on Mar. 15, 2013, a plurality of defect cells that are different from the matrix cells of the cladding region of a hollow core fiber are positioned at the hollow core-cladding boundary. The defect cells having at least one property different from the matrix cells are arranged in a pattern that defines two orthogonal axes of reflection symmetry so as to produce birefringence in the light propagating in the hollow core of the fiber. It is particularly noted that the birefringence may be controlled more effectively when the defect cells are positioned proximal to the hollow core-cladding boundary.

In the prior art fibers designed for controlling polarization states, a common understanding has been that any additional feature included in the cladding should be proximal to the core to couple unwanted core modes to these additional features. The conventional understanding is that features more than a few lattice periods away from the core exert little influence or control on mode properties, aside from a tendency of an irregular lattice to cause excess signal loss. Thus prior art suggests that the outer portion of the cladding should contain no useful features, and in fact should be made as periodic as possible.

While many hollow core fibers support polarization suppression to some extent, what is required for best system performance is often a combination of properties difficult to achieve simultaneously namely, low loss in a desired polarization state, high loss in the unwanted polarization state, large resistance to polarization coupling, operation covering a desired band of wavelengths, robustness to variations in fabrication, just to name a few. In prior art fiber designs all these properties could not be achieved simultaneously.

SUMMARY OF THE INVENTION

The invention provides a new class hollow core fiber exhibiting selective suppression of a preferred polarization mode. The new fiber comprises a cellular cladding of individual cells connected at the cell walls and distributed in a cellular lattice or a cellular web. A predetermined number of cells are intentionally omitted in a contiguous pattern to provide a hollow core embedded in the cellular cladding. In one aspect of the invention a pre-selected number of cells are substituted with a different type of cell that differ from the regular lattice cells in at least one physical and/or chemical property. The substituted cells comprise leakage cells or leakage features in the cladding to collectively provide a leakage path to allow at least one polarization mode from the hollow core to selectively leak through the cladding while a preferred polarization mode is guided through the hollow core.

The leakage cells may be selected to have a preferred shape, size, distribution, chemical composition or a combination of different properties so as to suppress a desired polarization mode and allow a dominant polarization mode to be transmitted through the core without significant loss. In one aspect of the invention the leakage cells may be positioned up to several lattice cells away from the core. In another aspect of the invention the leakage cells are disposed centered around or touching a line segment between the core-cladding interface and the outer edge of the cladding. In yet another aspect, the line segment is one or more axis of reflection symmetry of the fiber. In a variant embodiment, additional cells may be introduced at the core-cladding interface to provide preferred birefringence properties to the fiber.

Furthermore, polarization suppression may be controlled by carefully selecting physical properties of the leakage cells such as their shape, size, wall thickness of leakage cells, number, position, distance from the hollow core-cladding interface, etc. as well as chemical properties of the material that comprise the leakage cells for example, composition of the glass. By selecting these properties either alone or in certain prescribed combinations, a pre-determined mode and/or amount of polarization may be suppressed for a signal transmitted in the hollow core of the fiber.

BRIEF DESCRIPTION OF THE DRAWINGS

Different aspects of the invention are described in detail in the specification by illustrations that depict salient features of the invention. The embodiments described may include one or more features that may be used alone or in different combinations with other features shown in other embodiments. These embodiments may be better understood in view of illustrations provided in attached drawing figures in which:

FIG. 2(a)-2(i) shows a few representative arrangements of according to this invention illustrating different combinations of core shapes, distribution of leakage cells, and surface features near the core inner cladding interface for inducing and/or controlling birefringence in the hollow core fiber;

FIGS. 10 (a) and 10(b) show a representative stack of coded capillaries to construct a an inner cladding comprising a cellular lattice including leakage cells that generate leakage paths from a hollow core across the inner cladding.

DETAILED DESCRIPTION OF THE INVENTION

The invention will be described using illustrations of different features in different drawing figures. For clarity, each drawing figure may include one or more features to highlight a particular aspect of the invention. However, features not shown in a particular drawing figure are not necessarily precluded from that or other embodiments. Accordingly, different features explained using different drawing figures may be used either alone or in combination with other features shown in other embodiments.

Figure 1:
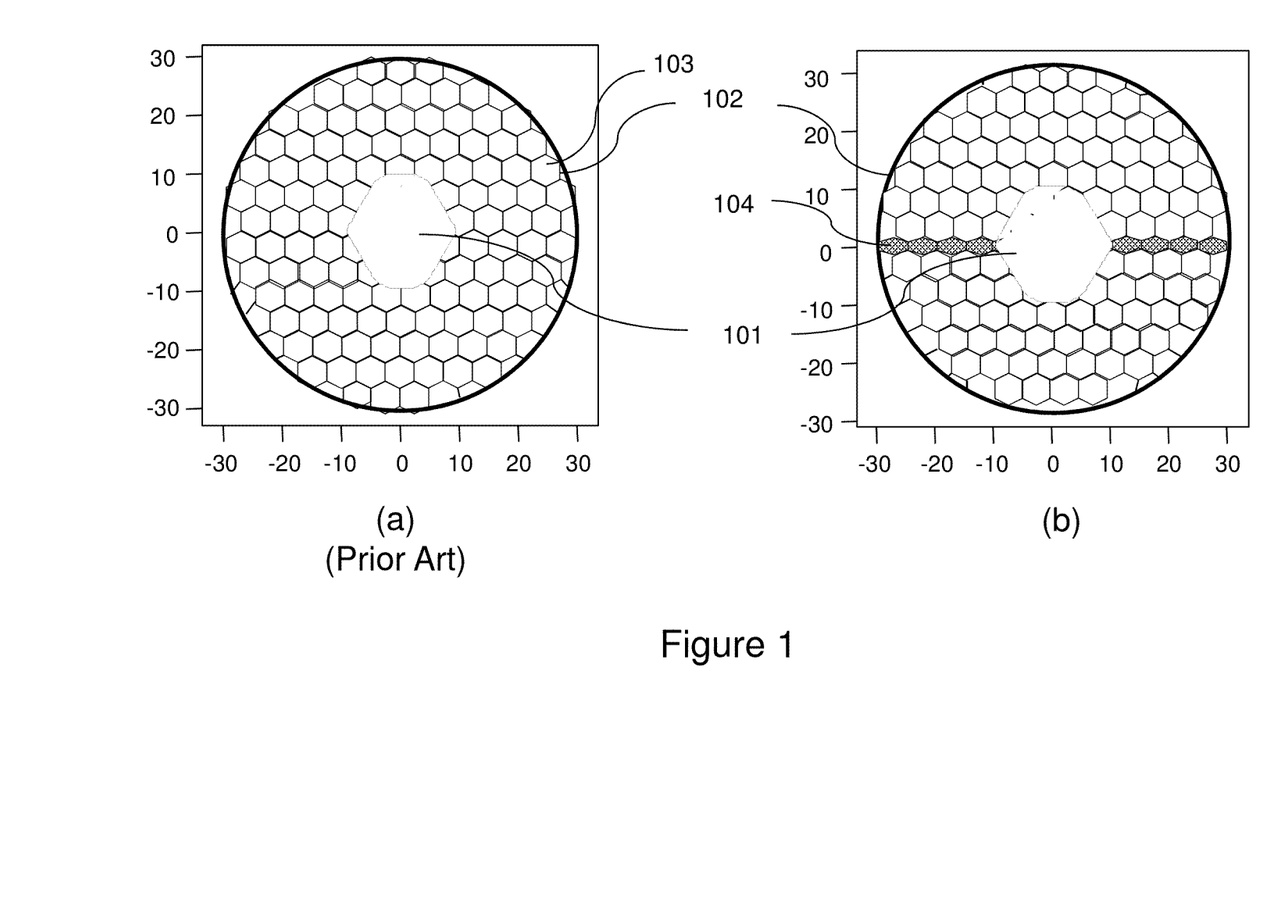
FIG. 1 shows a) a prior art hollow core fiber, and b) a hollow core fiber with leakage cells positioned along one axis of the fiber.

Referring now to FIG. 1, there it shows a schematic cross section view depicting basic features of a typical prior art hollow core fiber. In particular, the hollow core fiber shown in FIG. 1a comprises a cellular structure where individual cell includes a cellular space 103 and a cell wall 102 enclosing the cellular space. The individual cells are of substantially similar nominal dimensions, cell wall thickness and chemical composition. The cells in this example are shown to be in a honeycomb pattern; however, cells having other geometrical shapes and pattern are not precluded. Adjacent cells are generally connected at the cell walls and distributed in a lattice pattern (or a cellular lattice or a web of cells, hereinafter) having a substantially uniform lattice spacing (substantially similar nominal spacing between the centers of adjacent cells). The lattice pattern in general, is uniform and regular. For ease of discussion, the cells comprising the cellular lattice will be referred as regular cells hereinafter.

The cellular lattice functions as an inner cladding (or cladding hereinafter) extending up to a pre-determined radial distance (cladding diameter) and the outer edge of the cladding is surrounded or enclosed in another outer cladding. A contiguous group of intentionally omitted regular cells arranged in a predetermined regular pattern in the cellular lattice, comprise a hollow core 101. The size and shape of the hollow core is determined respectively by the number and arrangement of omitted cells. The dimension and shape of the hollow core is often described in terms of the number of missing cells (13 cell, 17 cell, 19 cell, 33 cell, and so forth). While the hollow core in this example is approximately a hexagon placed at the center of the cellular lattice, different shapes and/or placement is not precluded. For example, a hollow core may be circular and be placed symmetrically or asymmetrically within the cellular lattice structure.

The hollow core functions as a transmission waveguide supporting predominantly a single, preferably a fundamental mode but other modes including one or more HOMs that may be a signal mode or an unwanted mode may also be present in the hollow core. In the prior art example of a hollow core fiber shown in FIG. 1a, the hollow core is disposed to exhibit reflection symmetry along one or both orthogonal axes passing through the core. However, the hollow cores having different reflection symmetries have been used to selectively impart a desired transmission characteristic for example, a preferred polarization mode, selective loss of an undesired core mode such as a higher order mode (HOM), etc. Some examples are provided in the co-owned and co-pending PCT application No. PCT/US/1332652, filed on March 15. These and other design aspects will be elaborated later.

FIG. 1b shows a schematic cross section of a new polarization selective fiber according to this invention. Similar to the prior art fiber, an inner cladding comprises a cellular lattice. More specifically, the cellular lattice includes cells having a cellular space 103 and a cell wall 102. The cells are connected at the cell walls and distributed in a lattice pattern similar to what is described in reference with FIG. 1a. The cellular lattice has a regular pattern of cells that may approximate a triangular lattice, rectangular lattice, honeycomb lattice, or other well-known lattice patterns.

A contiguous group of intentionally omitted regular cells arranged in a predetermined regular pattern in the cellular lattice, comprise a hollow core 101. Omission of cells in the hollow core region locally disrupts the continuity of the lattice structure only in the core region while retaining the lattice structure around the core. The pattern of cells around the core region may correspond to an ideal (e.g., triangular) pattern, or have a distortion pattern (e.g., triangular lattice distorted by enlargement of the core).

In one aspect of the invention, a predetermined set of the regular cells in the cellular lattice are substituted with a corresponding set of a different type of cell(s) 104 shown shaded in this view (only one labeled for clarity). The substituted cells (leakage cells hereinafter) in general, replace a regular cell at a nominal lattice site. The leakage cells differ from the regular cells in at least one physical and/or chemical aspect. For example, in the embodiment shown in FIG. 1b, the leakage cells 104 are of a different shape and size. More specifically, leakage cells in this group are collapsed or compressed in the vertical direction (referring to the figure) relative to nominal dimension of the regular cells. Alternatively, the leakage cells may be generated by expanding a regular cell from their nominal dimension. It should be understood that leakage cells do not disrupt the lattice pattern in general but it may cause a distortion in the lattice pattern particularly, if the leakage cells substantially differ in physical dimensions from the regular lattice cells.

In a variant aspect, leakage cells are often placed along a line segment between the core-cladding interface and the outer edge of the cladding. For example, the leakage cells may be centered on the line segment, or they may just touch the line segment (on one or both sides). The leakage cells may be disposed along one symmetry axis of the fiber as shown in this example (FIG. 1b). However, other distribution or patterns may be used to achieve desired transmission characteristics such as, polarization state, selective suppression of a mode, HOM suppression to name a few, within the broader framework of the invention.

The leakage cells locally modify the properties of the cladding layer. Leakage cells are designed to collectively provide a leakage path in the cladding layer. A leakage path may extend across the cladding from the core-cladding interface towards the outer cladding as shown in FIG. 1b. The fiber appears to be 'zipped' together, along a leakage path. For the purpose of discussion, this fiber will be synonymously referred as 'Zipper Fiber' hereinafter. More specifically, one or more leakage cells positioned close enough to each other in the cladding region provide one or more continuous leakage paths for some of the core modes by selectively coupling them to the cladding and provide optical coupling of selected core modes to the outer cladding boundary. Although FIG. 1b shows one type of a leakage path other possible options are not precluded and will be described later.

One important aspect of this invention is that the leakage cells positioned several lattice cells away from the core-cladding interface contribute to the polarization suppression. This particular feature is contrary to the conventional understanding that the polarization characteristics are influenced only by defects in the cellular lattice that are positioned closer to the core-cladding interface. It may be recalled that the hollow core fiber described in the co-owned and co-pending PCT application No. PCT/US/1332652, filed on March 15, generates birefringence due to the defect cells introduced in the cellular lattice near or at the core-cladding interface.

It is known that alternative paths to effectively suppress polarization dependent loss and HOMs in hollow core fibers may be provided via additional hollow core waveguides or shunt cores described in the U.S. Pat. No. 7,865,051 issued on Jan. 4, 2011, and U.S. Pat. No. 7,356,233 issued on Apr. 8, 2009, respectively, both to Fini. However, it is important to note that by definition, a hollow core waveguide is intentional omission of a pre-determined number of regular cells in a contiguous pattern, whereas the leakage cells of a different type that are substituted in place of regular cells. Thus, leakage cells modify the lattice at the individual cell site while preserving the topology of the lattice, while a hollow core, including a shunt core, changes the topology of the lattice in the fiber. This is an important distinction between the shunt core fiber and the zipper fiber disclosed in this application.

Figure 2:
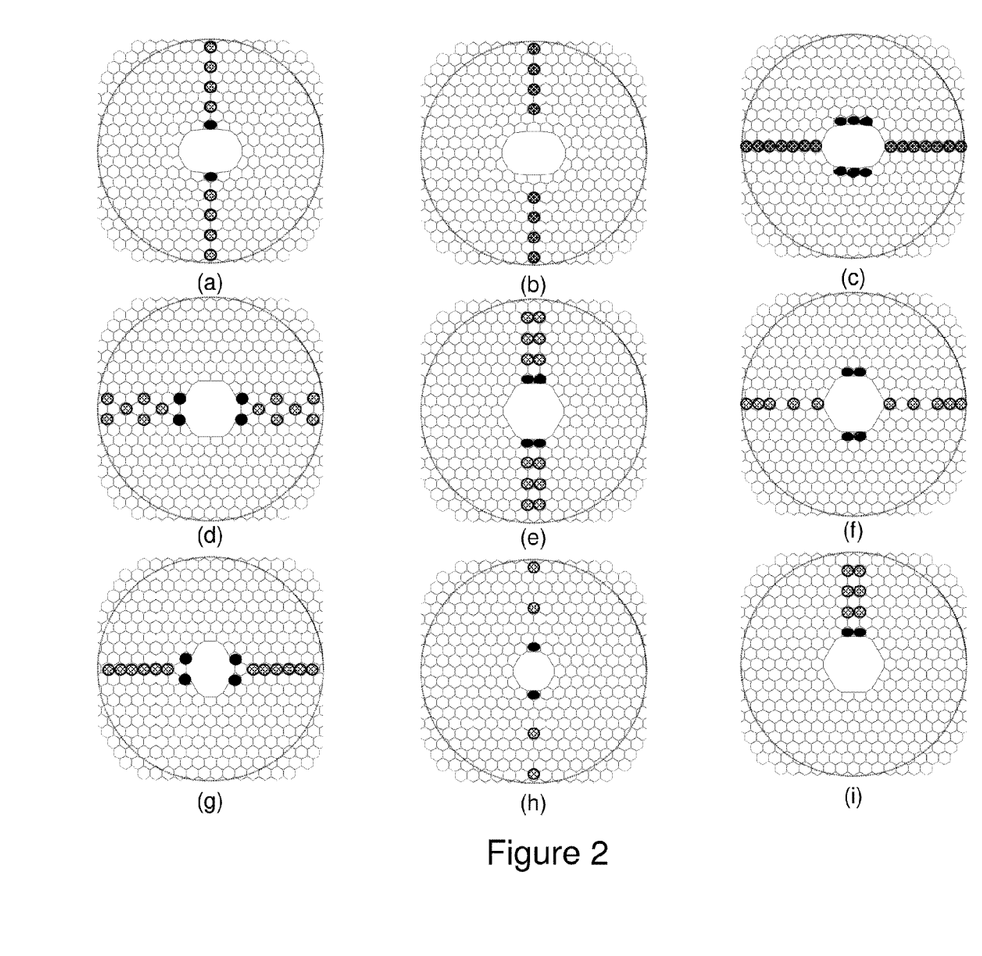

The leakage cells may be placed in close proximity to the core-cladding interface or/and may be distributed up to several lattice cells away from the core-cladding interface to generate a pre-defined leakage path. Some typical examples of placement of leakage features are schematically shown in FIG. 2. More specifically, FIG. 2 (a-i) represents a schematic view of a hollow core fiber cross section comprising a central core surrounded by a cladding of a cellular lattice similar to that described in reference with FIG. 1. The large solid circle in each figure shows an illustrative extent of the lattice, in this example, 19 cells in diameter. The leakage cells are shown shaded. It is important to note that the leakage cells located even 3-7 lattice spacing away from the core-cladding interface play a crucial role in providing a continuous leakage path from core to outer cladding edge by tunneling.

In another aspect of the design, the leakage path from core edge to outer cladding edge would preferably have gaps between leakage cells of at most approximately one lattice spacing (FIGS. 2a and 2e). Alternately, this path may have gaps equivalent of a few times the lattice spacing between leakage cells. For example, each path from core to cladding edge will typically have leakage cells placed at two or more lattice spacing distance from the core. In a preferred embodiment each path will include leakage cells placed at three or more lattice spacing from the core (FIG. 2h). In any case, the gaps between leakage cells must still be much smaller than the full radial extent of the cladding.

One advantage of the zipper fiber is that tunneling is not the only mechanism available for energy loss in the leakage cells and distant leakage cells also play an important role in extending the suppressed mode into the cladding, in addition to, or as an alternative loss mechanisms including but not limited to, scattering, absorption, mode coupling. In addition to the leakage cells some fiber designs also include surface features for example, features shown in (FIGS. 2a and 2c-2i dark filled circles) that aid in controlling birefringence further. Additional birefringence may also be provided by using non-symmetric core shape for example, an elliptic core (FIGS. 2a, 2b and 2c), and/or by other means applied while drawing the fiber and are well known in the art.

Polarization Dependent Loss and Selective Polarization Suppression:

In one aspect of the invention the fiber is designed with a core having an axis of reflection symmetry defining a birefringent axis of two core-guided polarization modes, the signal mode and the noise mode (or unwanted mode). The leakage cells may also be arranged to have an axis of reflection symmetry substantially similar to one axis of symmetry of the core. In a more specific embodiment, a leakage path may be centered on this axis of symmetry. These symmetry principles minimize cross-coupling, such that the leakage path suppressing the noise mode is not available to the signal mode, and so the signal mode has a desirable low loss.

The leakage cells introduce leakage modes (cladding modes with significant power near the leakage cells) that couple to the core modes. The leakage modes are highly polarization dependent, and so the polarization dependent coupling is significantly large. Therefore, leakage cells in the cladding may be designed to particularly allow one core-guided polarization mode to selectively leak through the cladding. Core-guided modes generally have some small portion of their power extending into the cladding. For fiber with leakage cells on the symmetry axis, the two polarization modes may have very different local intensity in the vicinity of these leakage cells or along leakage paths, such that one polarization (the signal) sees strong confinement in the hollow core, while the other polarization has a much larger component extending out of the core.

Specific fiber geometries have been simulated to calculate birefringence and loss estimation in two orthogonal polarization modes. A fiber is simulated by arranging capillaries similar to an arrangement in a stack produced in a 'stack and draw' method. More specifically, a hollow core fiber is simulated by having, a) a core defined by several "missing" capillaries, and b) several leakage cells are defined with capillaries having different thickness as compared to a default capillary thickness that forms the cellular lattice. Thicknesses are typically quantified by the "glass-fill-fraction" (GFF) of a capillary n, related to the ratio of inner diameter ($D_{in,n}$) to outer diameter ($D_{out,n}$) by $GFF_n = 1-(D_{in,n}/D_{out,n})^2$. Simulations indicate that leakage features and surface features preferably have $GFF_n/GFF_0$ in the range 1.1 to 2, where $GFF_0$ is the glass fill fraction of the lattice capillaries. Specific preferred values of $GFF_n$ depend on all of the other geometric parameters of the fiber.

In addition to the basic hollow core fiber, surface and leakage features may additionally be placed in different arrangements as shown in FIG. 2. More specifically, regular cells of the cellular lattice are marked as open circles, leakage cells are marked as shaded circles and surface features located at the core-cladding interface are marked as dark filled circles. It is noted that the schematic views shown in FIG. 2 indicate only placement of capillaries in the stack, not the detailed geometry of the cellular structure. In the illustrative examples, 7-cell (FIG. 2h), 13-cell (FIGS. 2a, 2b and 2c), 14-cell (FIG. 2g), and 19-cell (FIGS. 2d, 2e, 2f and 2i) cores are shown, but other core sizes and shapes are possible. Birefringence of the core-guided modes is desirable since it provides resistance to polarization coupling, and can be provided by an oblong core shape (elliptic core in 13-cell geometry in FIGS. 2a, 2b and 2c), by adding surface features, or by distortions of the lattice structure that break the N-fold rotationally symmetry (N>2) of the lattice near the core.

Figure 3:
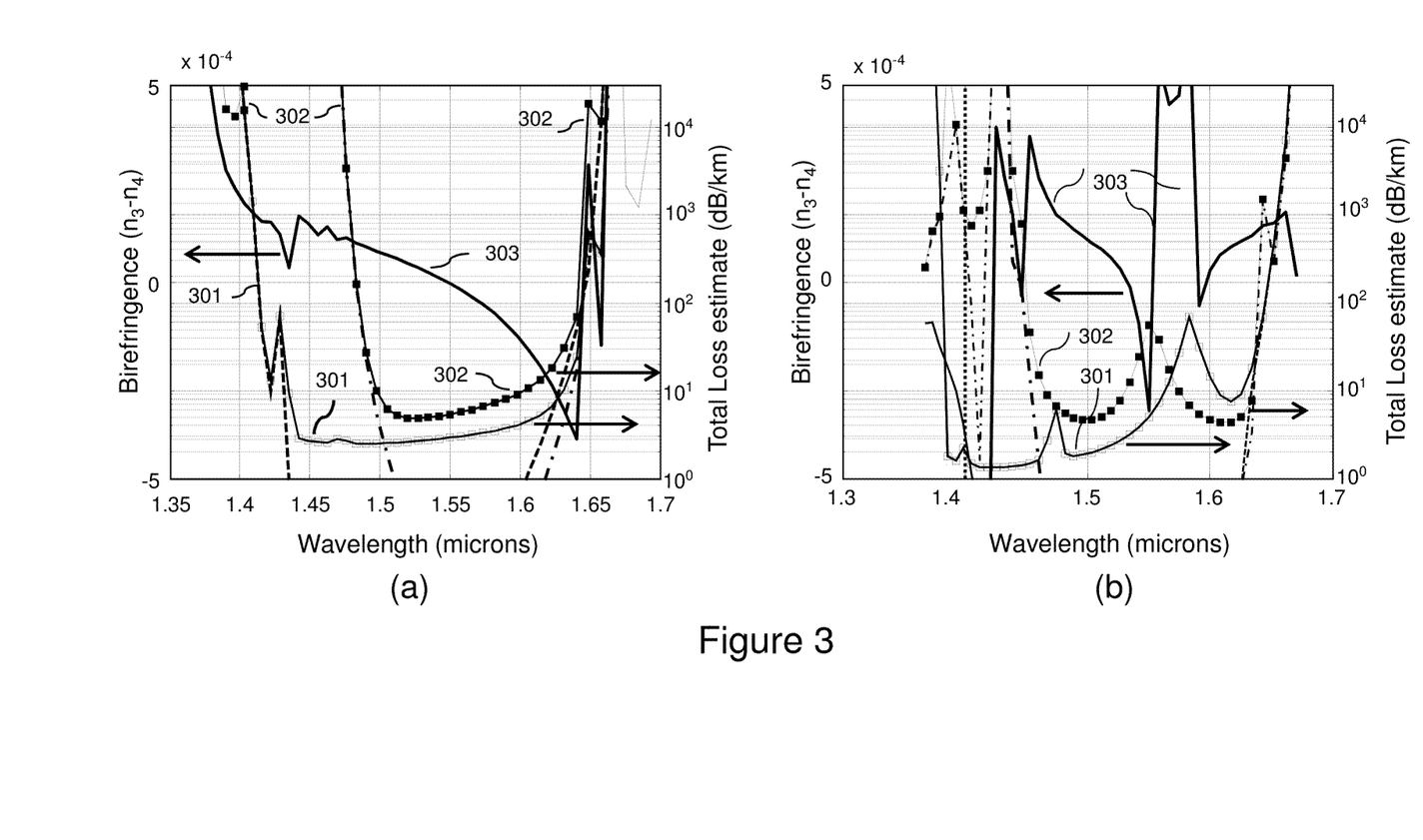
FIGS. 3(a) and 3(b) show calculated birefringence and polarization dependent loss for two representative hollow core fiber designs shown in FIG. 2.

Simulation results for birefringence and total loss for the two polarization states are shown as a function of wavelength in FIG. 3 for two different fiber geometries substantially similar to the geometries shown in FIGS. 2b and 2e, respectively. These are shown in FIGS. 3a and 3b, respectively. In particular, the solid line 303 represents the birefringence plotted on the y-axis (left) as a function of wavelength (x-axis). Polarization dependent loss (tunneling+scattering) is plotted on y-axis (right) for two different polarizations 301 and 302 shown as open and filled squares connected with dash and dot-dash lines, respectively.

It is noted that even small changes in geometry lead to fairly large variations in optical properties expected from two different fiber geometries. For selected fiber geometries, simulation results indicate that there is a wavelength range where birefringence is significantly high and polarization loss is low in one polarization state, and high in the other polarization state. The simulation results indicate that by appropriately selecting core geometry, cladding parameters, leakage cells and birefringence controlling surface features at the core-cladding interface, it is possible to design fibers that exhibit low loss, significant birefringence and polarization selectivity in coupling to the cladding modes resulting in suppression of a particular polarization mode.

Figure 4:
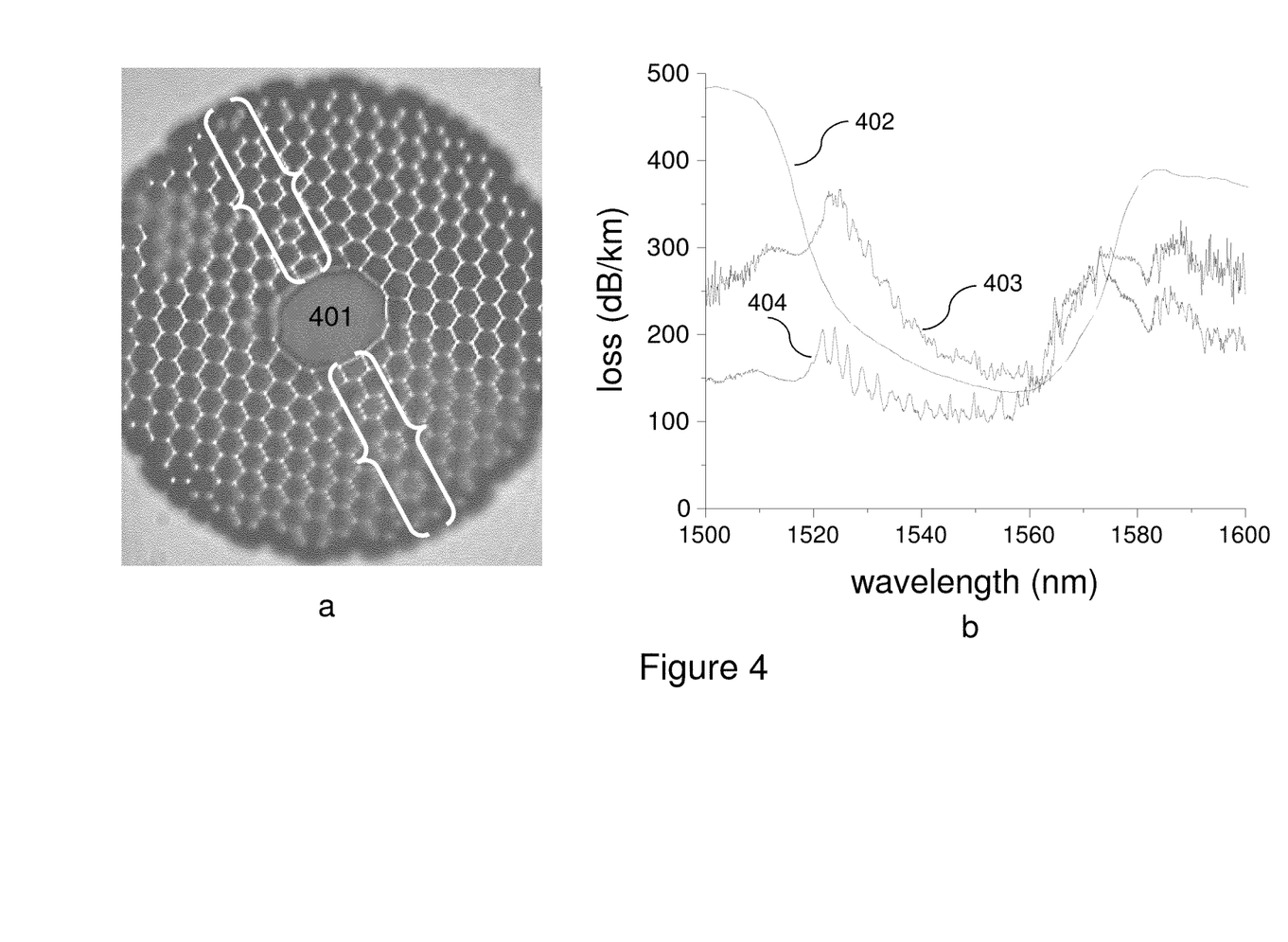
FIGS. 4(a) and 4(b) show a representative hollow core fiber constructed according to this invention, and measured polarization loss characteristics of the representative fiber, respectively.

Fibers having target geometries substantially similar to those shown FIGS. 2a, 2b and 2e, have been fabricated. A photograph of a cross section view of an exemplary hollow core fiber having a cellular cladding constructed according to this invention is shown in FIG. 4a. In particular, in the geometry shown in FIG. 4a the core (401) is selected to be elliptical for providing birefringence. The leakage paths present on either side of the core along its short axis are highlighted by enclosing them in white curly brackets. Measured fiber loss is plotted in a graph shown in FIG. 4b. The experimental loss measured for this particular exemplary fiber is plotted (y-axis) as a function of wavelength (x-axis). Total loss of un-polarized light is shown in trace 402, whereas loss of light polarized along the short and long axes of the core, are shown in traces 403 and 404, respectively. The fiber preferentially exhibits a higher loss for polarization along the short axis as compared to the long axis. The results from the exemplary fiber demonstrate that by carefully selecting the leakage cell geometry and their placement a low loss fiber with a higher polarization dependent loss in one preferred direction is achieved.

Figure 5:
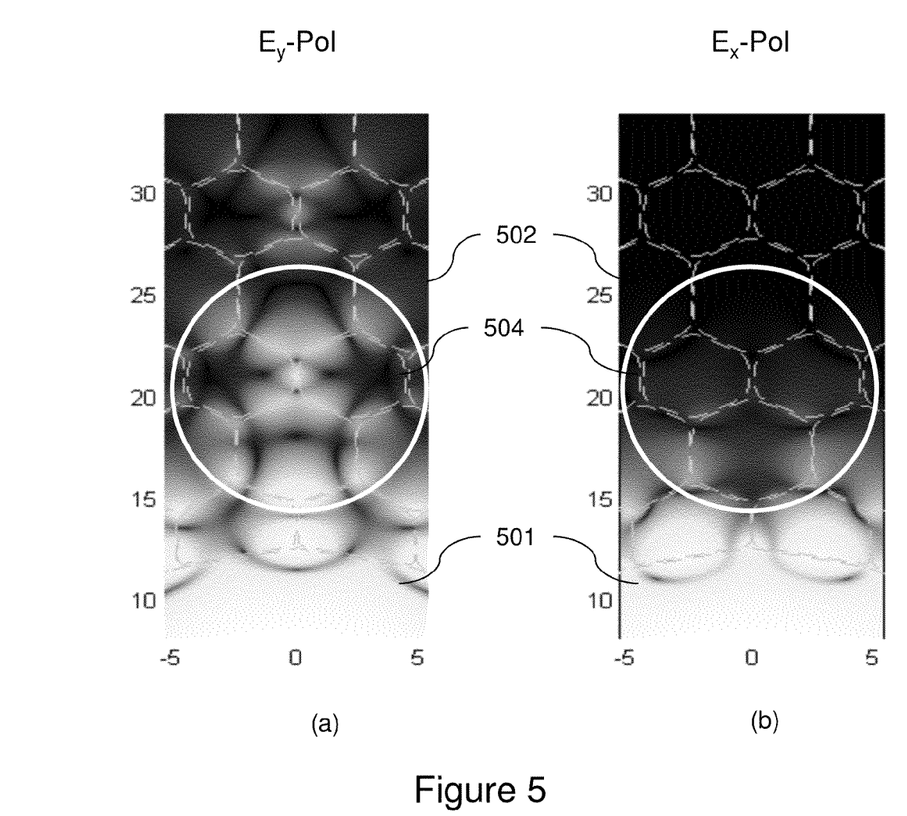
FIG. 5 shows a calculated portion of the mode field patterns for x and y polarization contents in a fiber constructed according to this invention.

Calculated mode patterns for a Zipper Fiber are shown in FIG. 5. More specifically, mode fields for y and x polarization states are shown in images (a) and (b), respectively for a Zipper Fiber design substantially similar to one shown schematically in FIG. 2e. The regions circled in the images highlight a pair of leakage cells (504) near the core of the fiber (501). More specifically, the leakage cells in this example have a different dimension (along vertical direction of the plane of the figure) as compared to the regular cells (502). It is quite clear that a significant amount of light is coupled in this region for y-polarization mode (FIG. 5a) as compared to the x-polarization mode (FIG. 5b), clearly demonstrating the polarization selective leakage through the cladding mode exhibited in a 'Zipper Fiber' constructed according to this invention.

Figure 6:
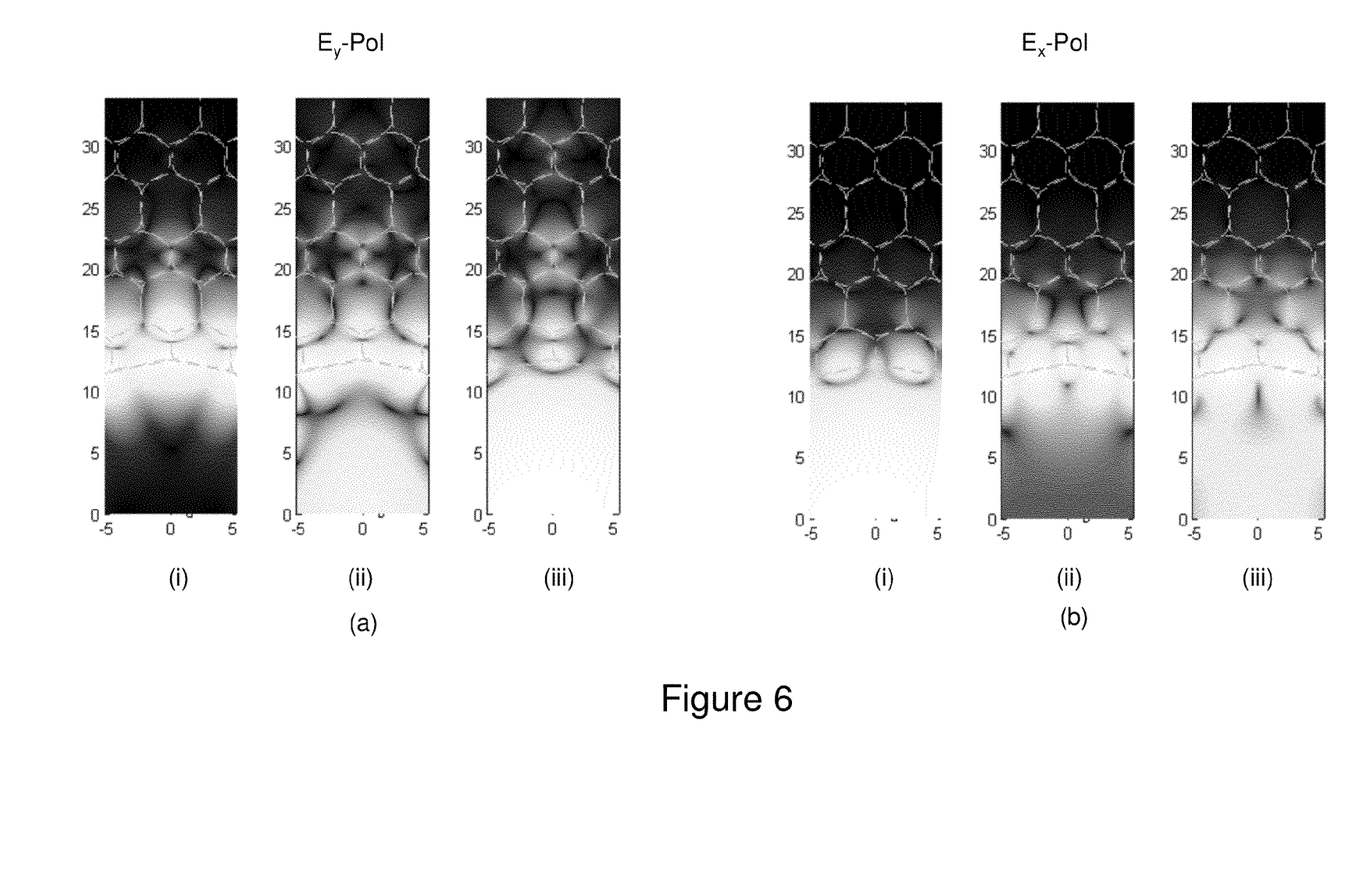
FIG. 6 shows a calculated portion of the mode field patterns of three different modes in x and y polarization states in a fiber constructed according to this invention.

FIG. 6 shows calculated mode patterns for an exemplary Zipper Fiber. More specifically, FIGS. 6a and 6b represent mode pattern images in y and x-polarization, respectively. Calculated modes images in FIG. 6 show intensity patterns in the vicinity of leakage cells similar to the one described in reference with FIGS. 5a and 5b for three different transverse modes, fundamental (i), core-guided HOM (ii), and surface mode (iii), respectively, in each group (FIGS. 6a and 6b). The intensity pattern in the vicinity of the leakage features is similar for three different transverse modes of the same symmetry. The structure of the mode fields in the cladding is roughly similar for different modes, but different for different polarization states. The mode images shown here also illustrate one important aspect of the Zipper Fiber namely, coupling to the leakage features that facilitate polarization suppression also lead to leakage of higher-order modes.

Figure 7:
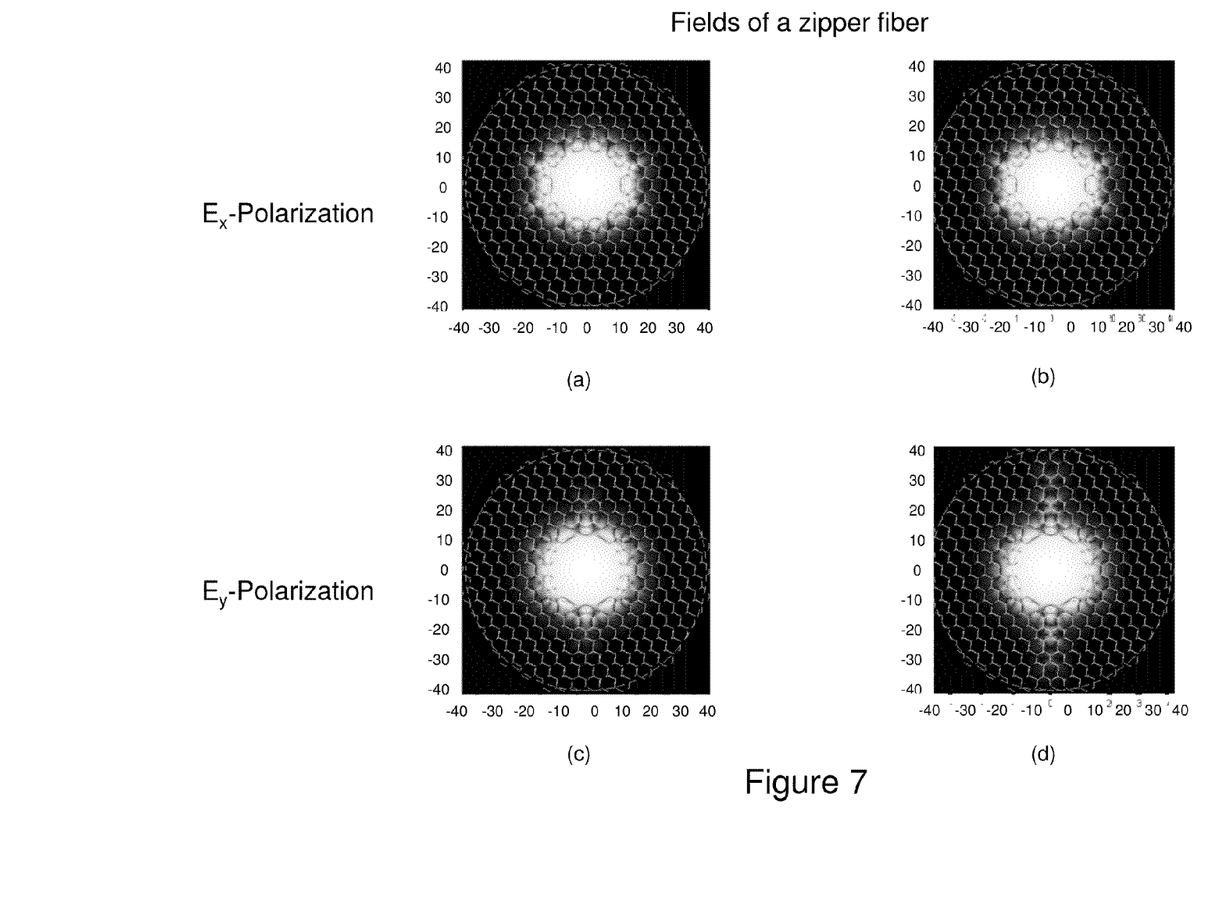
FIG. 7 shows calculated mode field patterns for x and y polarization states for fibers where leakage features and polarization controlling surface features are varied for optimum mode suppression.
Figure 8:
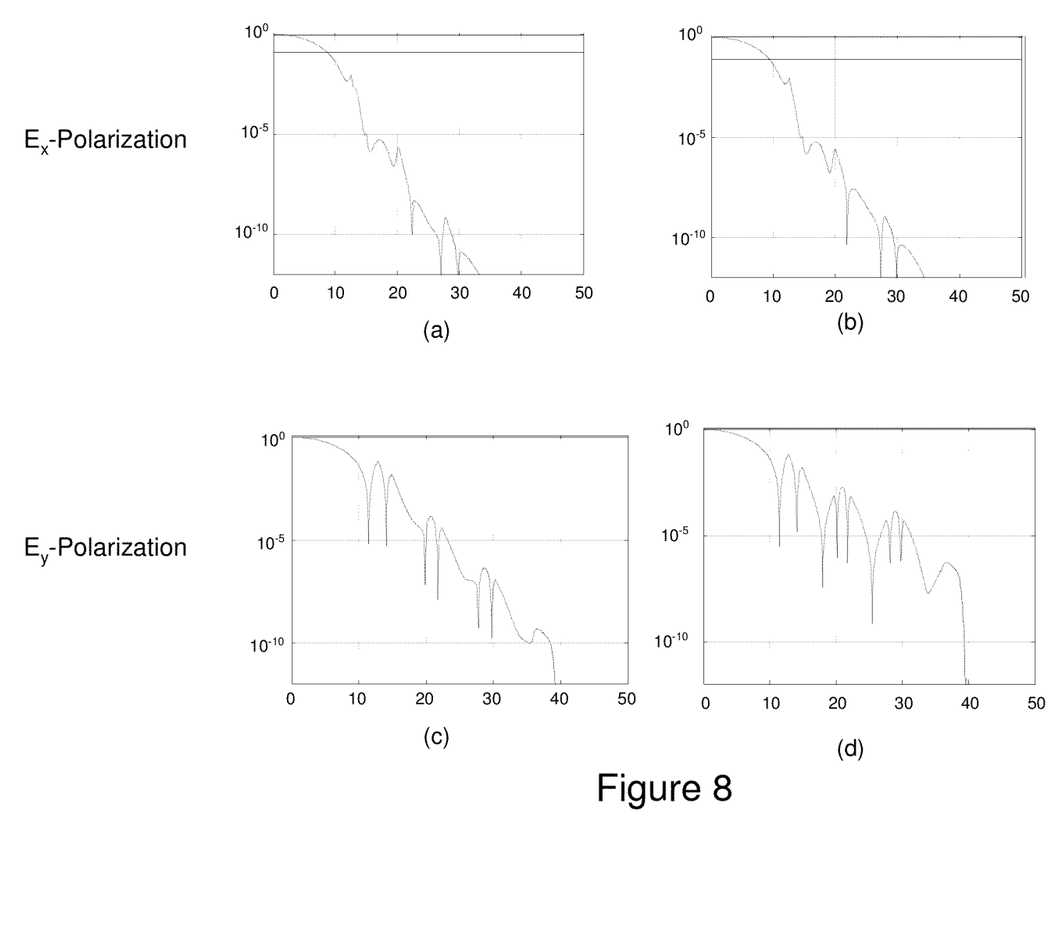
FIG. 8 shows calculated mode field patterns for x and y polarization states ($E_x$ and $E_y$, respectively) plotted as a function of position along the axis of leakage features, for two different fibers shown in FIG. 7.

Referring now to FIGS. 7 and 8, calculated mode field intensities for two different fibers are shown therein. More specifically, FIGS. 7a and 7c show mode field intensity images in x and y polarizations for a fiber having leakage cells with thinner cell walls as compared to the regular cells of the cellular cladding, whereas FIGS. 7b and 7d show counterpart images for a fiber having leakage cells with thicker cells walls as compared to the regular cells. The structures of the leakage cells control the coupling to core modes and degree of polarization-dependent confinement, loss, etc.

Calculated mode field intensities are compared in FIG. 8 where mode filed intensity in log scale is plotted (y-axis) as a function of distance (x-axis) from core-cladding interface in to the cladding, for the same two fibers shown in FIG. 7. More specifically, FIGS. 8a and 8c respectively show x and y polarization intensity, for a fiber with leakage cells having thinner walls and FIGS. 8*b* and 8*d* show similar plots for a fiber with leakage cells having thicker cell walls, as compared to the regular cells in the cellular cladding. The Ey-polarized field (FIGS. 7*d* and 8*d*) penetrate farther in the cladding for the fiber having thicker leakage cells, while the Ex-polarized field remains relatively confined for both fiber geometries. It is noted that the loss mechanism in Zipper Fiber is dominantly polarization sensitive.

Selective Suppression of Higher Order Modes:

In another aspect of the invention, in addition to selective suppression of a polarization mode, a fiber e designed according to this invention may also provide selective suppression of higher order modes (HOM). In a co-pending and co-owned application No. PCT/US13/35345 filed on filed Apr. 4, 2013, by Fini, it is disclosed that unwanted core modes including HOMs, may be effectively suppressed by allowing unwanted modes to selectively couple to shunt modes in a shunt core fiber. Shunt core fiber is basically a hollow core fiber where additional waveguide(s) (smaller hollow cores) are located near the central core. The additional waveguide(s) provides paths for unwanted modes to leak to the cladding. However, the loss mechanism in that fiber may or may not be polarization sensitive.

Figure 9:
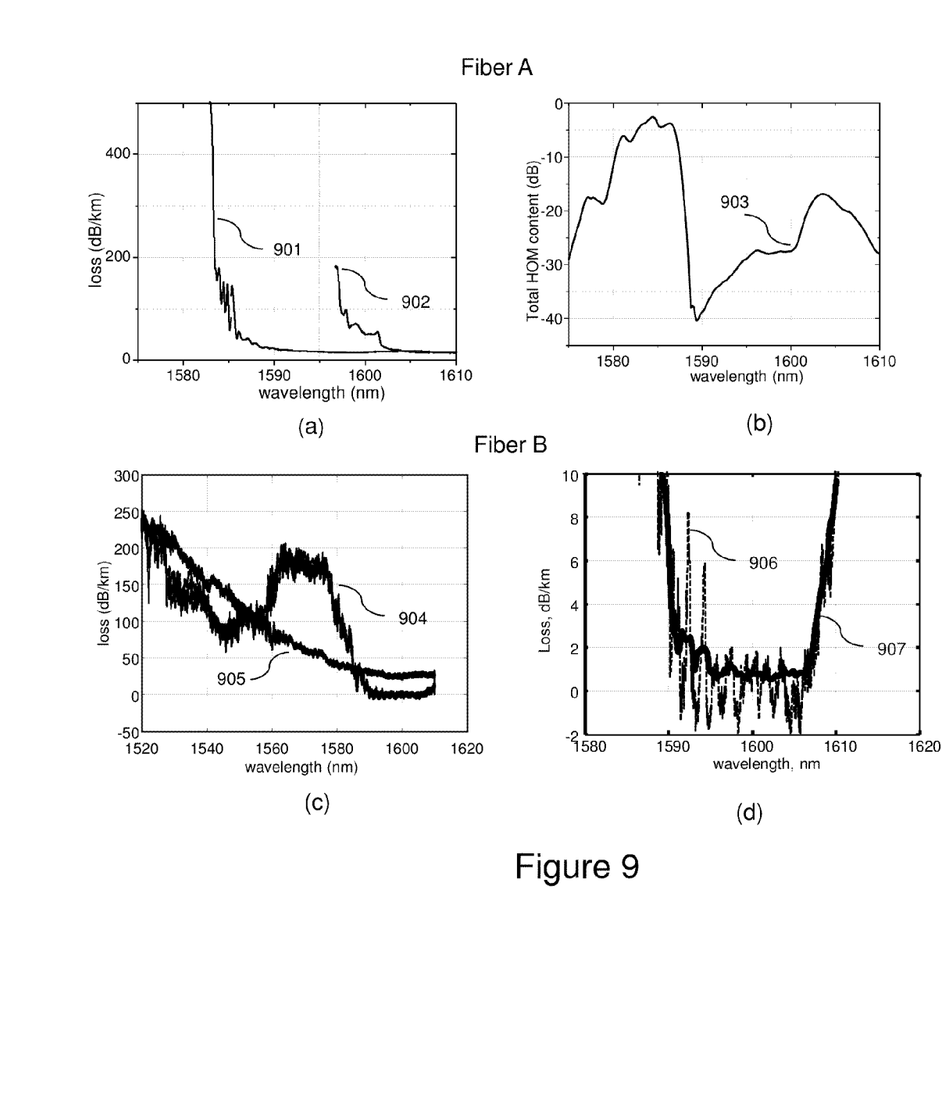
FIG. 9 shows measured polarization loss and Higher Order Mode content for two different types of hollow core fibers constructed according to this invention.

In one aspect of the invention, a fiber may also be designed with significant polarization dependent loss as well as suppression of HOMs (higher loss in HMOs). This aspect is demonstrated in the graphs shown in FIG. 9 shows. More specifically, measured polarization dependent loss and total HOM content are respectively shown in plots (a) and (b) for an exemplary fiber (Fiber A). The exemplary Fiber A shows a high degree of polarization dependent loss between the two traces (901 and 902, respectively), and a high degree of HOM suppression (trace 903) as well. Equivalent results from another exemplary fiber (Fiber B) are plotted in graphs (c) and (d) exhibit a moderate degree of polarization dependent loss (904 and 905 traces) but no significant HOM suppression. The two traces in graph (d) represent the same data except that the trace 907 is a corrected version of trace 906 to make it smooth.

Preferred Method for Manufacturing:

It is known that birefringence or polarization properties of a fiber may be introduced by while drawing the fiber or by post processing methods. Leakage cells as described in this invention may be introduced in several ways. Typically, a fiber is fabricated in a multi-stage process. The final geometry is determined by the assembly (or stack) of capillary elements, by the draw process, by post-processing of the fiber after draw, etc. In one preferred form of the well-known 'stack and draw' method for constructing a zipper fiber, leakage cells are introduced while assembling the stack by arranging capillaries that have different properties from the capillaries that constitute regular cells of the stack. To illustrate the preferred method of introducing leakage cells two examples of typical assembly of capillaries for a 'stack and draw' method are shown in FIG. 10.

Figure 10:
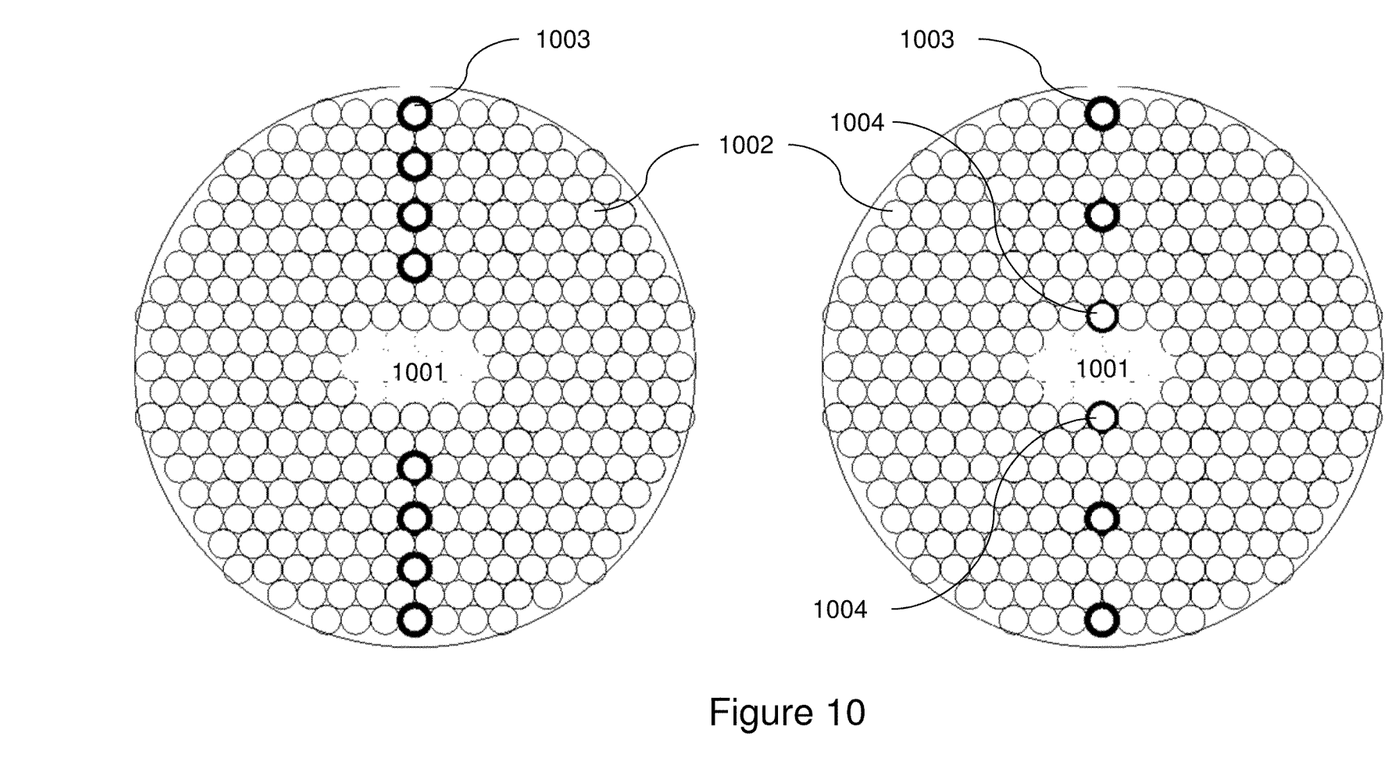

More specifically, in FIGS. 10(*a*) and 10(*b*), the open circles 1002 represent capillaries that represent regular cells of the cellular structure of the cladding. These capillaries are stacked in a regular lattice pattern. A contiguous set of capillaries are intentionally omitted from the center of the stack to define the hollow core 1001. In this example the core is nominally elliptic. However, cores having other shapes and sizes may be constructed similarly for a different fiber design within the broad principles of the invention. The capillaries for introducing leakage cells are shown in bold circles 1003. In this example, the capillaries for leakage cells are arranged along one of the symmetry axis of the core. In addition to the leakage cells, the design shown in FIG. 10*b* includes capillaries to introduce surface features 1004 near the core-cladding interface. The surface features are optionally added to induce or control birefringence or to produce a core-surface mode structure that facilitates polarization suppression.

Generally, the stack should form a close-packed structure if possible, so the leakage capillaries should preferably have the same outer diameter as lattice capillaries. Features in the assembly can be used to control features in the final fiber geometry in several ways: Capillary thicknesses determine the total amount of glass surrounding each cell. The size of cells is determined by the corresponding capillary's thickness, viscosity, etc. For example by replacing some cladding capillaries with capillaries of a different thickness, different material properties (e.g. viscosity), loading of materials that out-gas during draw, etc. would determine the final fiber properties.

Leakage features arising due to differential collapse or expansion of cells may be introduced during the fiber draw process. For example, formation of leakage cells may also be accomplished in one of many ways, such as by sealing one group of capillaries differently from the capillaries forming regular cells or by using internal pressure to affect the size of the cellular gap. Also, the refractive index, absorption, or scattering of the capillaries forming leakage cells may be altered by selecting different materials and surface processing of the capillaries.

Figure 11:
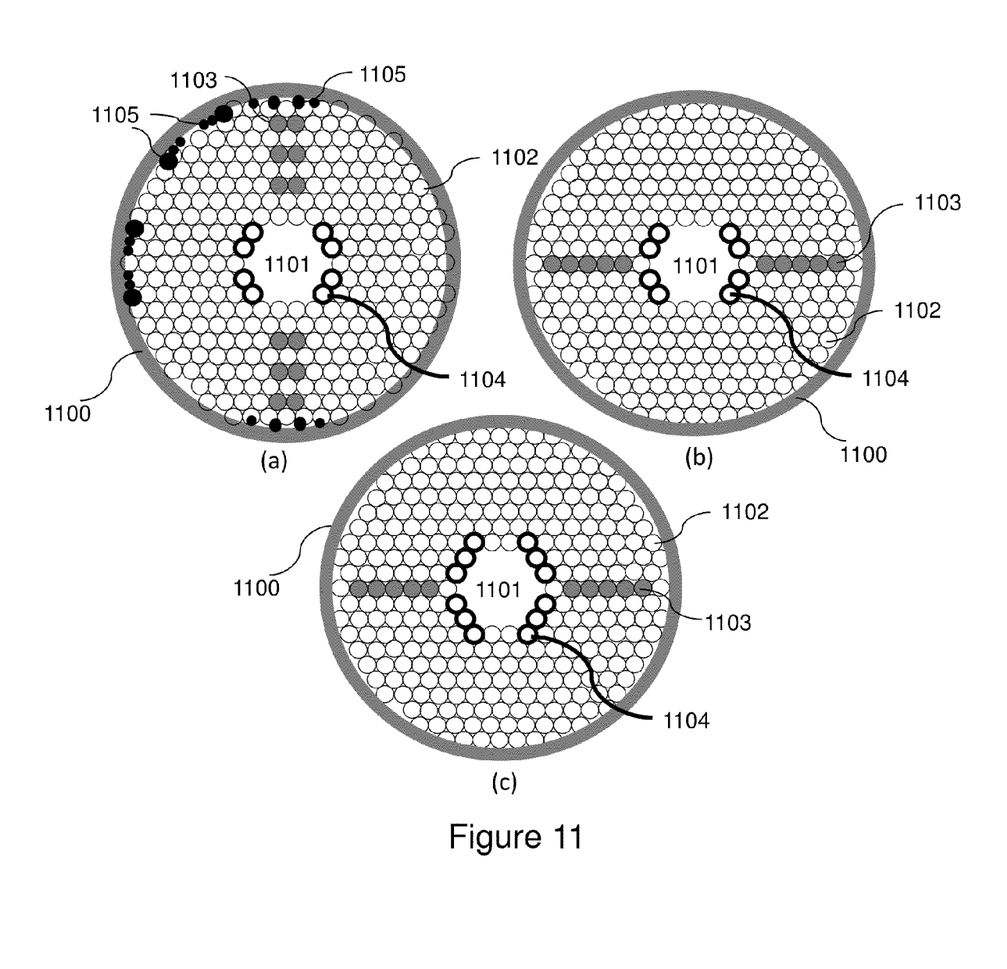
FIG. 11 is a schematic representation of a stack of coded capillaries to construct a an inner cladding comprising a cellular lattice including leakage cells that generate leakage paths from a hollow core across the inner cladding, and additional cells located at the core-cladding interface for polarization controlling surface features.

More complex stacking arrangements may be used for the fiber draw process for a desired level of suppression and control on polarization dependent loss. FIG. 11 shows several alternative arrangements for stacking capillaries. The capillaries are labeled substantially similar to those shown in FIG. 10. The outer grey circle labeled 1100 represents the confining tube used to arrange the stack. The capillaries 1102 arranged in a regular lattice pattern represent the cellular lattice structure. Selected capillaries in the lattice structure are substituted with capillaries 1103 (shown shaded) that have different properties for example, a different air fill factor (AFF) that determine the shape and size of cells in the finished fiber. A contiguous set of capillaries intentionally omitted from the center determine the shape and size of the hollow core 1101.

Optional surface features are introduced by stacking another set of capillaries (1104 shown as bold circles) that are placed at the core-cladding interface. These capillaries are selected to have properties that are different from the capillaries representing regular cells 1102. Solid canes of different sizes 1105 (dark circles shown in FIG. 11*a*) may be added to the assembly at the interface between the cladding capillaries and the confining tube to fill gaps in order to produce a tight assembly. While only few of these canes are shown for clarity, they are used all around the stack for better stacking of the assembly.

While principles and methods of the invention is explained using a few representative embodiments, other arrangements of leakage cells may be applied to practice the invention to achieve a desired level of polarization dependent loss, polarization suppression to control and optimize transmission in the hollow core. All other combinations and sub-combinations that may be apparent to those skilled in the art are covered by the claims that follow.

What is claimed is:

1. An optical fiber comprising:
 a hollow core; and
 a cellular cladding disposed around the hollow core from the core-cladding interface to an outer edge, said cladding including a plurality of cells arranged in a cellular lattice pattern, wherein the plurality of cells include at least two types of cells that differ from each other in at least one property, and wherein a pre-determined number of a first type of cells are substituted with a second type of cells, such that the second type of cells collectively provide at least one leakage path across the cladding for at least one core mode to optically couple to the cladding, wherein the second type of cells are disposed in the cellular lattice such that the at least one leakage path across the cladding is made polarization sensitive to selectively allow a preferred polarization state of the at least one core mode to couple to the cladding while allowing the transmission of the orthogonal polarization state through the hollow core.

2. The optical fiber as in claim 1, wherein the cellular lattice pattern of the cladding comprise a nominally regular lattice pattern having substantially uniform lattice spacing.

3. The optical fiber as in claim 2, wherein at least two or more of the second type of cells are disposed up to a distance that is more than one lattice spacing from the core-cladding interface.

4. The optical fiber as in claim 1, wherein the first and second types of cells differ in at least one physical dimension.

5. The optical fiber as in claim 1, wherein the at least one property that differentiates the first and second types of cells is one selected from the group consisting of, physical dimension, shape, cell thickness, chemical composition, and a combination thereof.

6. The optical fiber as in claim 1, wherein at least two or more of the second type of cells are disposed on a line segment located between the hollow core and outer edge of the cladding such that said second type of cells are either centered around, or touch said line segment.

7. The optical fiber as in claim 1, wherein the second type of cells are preferably disposed along a symmetry axis of the hollow core.

8. The optical fiber as in claim 1, wherein the hollow core geometry is asymmetric in orthogonal directions such that a preferred birefringence axis is selected for supporting a pre-determined polarization state.

9. The optical fiber as in claim 8, wherein the second type of cells in the cellular lattice are disposed across the cladding in an arrangement that has reflection symmetry across the birefringence axis of the core.

10. The optical fiber as in claim 1 further including one or more cells that differ from the first and second types of cells, said one or more cells disposed at the core-cladding interface induce surface defects that further control birefringence.

11. An optical fiber comprising:
a hollow core; and
a cellular cladding disposed around the hollow core from the core-cladding interface to an outer edge, said cladding including a plurality of a first type of substantially similar regular cells arranged in a cellular lattice pattern having a uniform nominal lattice spacing, wherein at least two or more of the first type of cells falling on a line segment between the hollow core and outer edge are substituted with a second type of leakage cells that collectively provide at least one leakage path across the cladding for at least one core mode to optically couple to the cladding, wherein said leakage cells differ from the regular cells in at least one property, wherein the hollow core geometry is asymmetric in orthogonal directions to define a birefringence axis, and wherein the leakage cells in the cellular lattice are disposed aligned with said birefringence axis, such that the at least one leakage path across the cladding is made polarization sensitive to selectively allow a preferred polarization state of the at least one core mode to optically couple to the cladding while allowing the transmission of the orthogonal polarization state through the hollow core.

12. The optical fiber as in claim 11, wherein at least two or more of the leakage cells are disposed on a line segment located between the hollow core and outer edge of the cladding such that said leakage cells are either centered around, or touch said line segment.

13. The optical fiber as in claim 11, wherein at least two or more of the leakage cells are disposed up to a distance that is more than one lattice spacing from the core-cladding interface.

14. The optical fiber as in claim 11, wherein the regular and leakage cells differ in at least one physical dimension.

15. The optical fiber as in claim 11, wherein the at least one property that differentiates the regular and leakage cells is one selected from the group consisting of, physical dimension, shape, cell thickness, chemical composition, and a combination thereof.

16. The optical fiber as in claim 11 further including one or more cells that differ from the regular and leakage cells, said one or more cells disposed at the core-cladding interface induce surface defects that further control birefringence.

* * * * *